(12) United States Patent
Slatter et al.

(10) Patent No.: US 6,540,415 B1
(45) Date of Patent: Apr. 1, 2003

(54) DOCUMENT CAPTURE STAND

(75) Inventors: David Neil Slatter, Bristol (GB); Colin I'Anson, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 29 days.

(21) Appl. No.: 09/840,001

(22) Filed: Aug. 31, 2000

(30) Foreign Application Priority Data

Sep. 2, 1999 (GB) .............................................. 9920598

(51) Int. Cl.[7] .............................................. G03B 17/02
(52) U.S. Cl. ........................ 396/428; 396/300; 348/373; 348/552
(58) Field of Search .................. 396/419, 428, 396/300, 544, 429; 348/373, 552, 14.01; 358/909.1

(56) References Cited

U.S. PATENT DOCUMENTS

| 4,474,439 A | | 10/1984 | Brown |
|---|---|---|---|
| 4,593,982 A | | 6/1986 | Rosset |
| 4,752,792 A | | 6/1988 | Keith |
| 4,831,455 A | * | 5/1989 | Ishikawa et al. ............. 348/373 |
| 5,374,971 A | * | 12/1994 | Clapp et al. ............. 348/14.01 |
| 5,920,342 A | * | 7/1999 | Umeda et al. ............. 348/211 |
| 5,980,124 A | * | 11/1999 | Bernardi et al. ............. 396/428 |
| 6,081,422 A | * | 6/2000 | Ganthier et al. ......... 348/14.01 |

FOREIGN PATENT DOCUMENTS

| EP | A-840200 | 5/1998 |
|---|---|---|
| GB | 754 792 | 8/1956 |
| GB | 1225505 | 3/1971 |
| GB | 2147427 | 5/1985 |
| WO | WO85/02917 | 7/1985 |

* cited by examiner

Primary Examiner—David M. Gray (57) ABSTRACT

A stand facilitates and supports the use of digital cameras including digital video cameras in performing an equivalent function to a scanner in recording digital images which may be downloaded to a computer. The stand incorporates means for automatically configuring the camera into a mode of operation for document image capture on placing said camera into said stand. Said stand is adjustable in height and includes hinge sections 201 to appropriately position said camera for use in capturing an image of a document.

56 Claims, 9 Drawing Sheets

DOCUMENT CAPTURE STAND

FIELD OF THE INVENTION

The present invention relates to camera stands and means and methods of supporting cameras, and particularly, although not exclusively, to a stand for holding a digital camera to allow the digital camera to act as a document capture device in obtaining digital images suitable for downloading to a personal computer.

BACKGROUND TO THE INVENTION

It is known in the prior art to employ flat bed scanners or hand held scanning devices to digitally record an image, commonly being a paper-based document e.g. a letter or photograph. Such scanning devices can download the digitally recorded data to a computer or other image processor where the data can be displayed on a visual display unit. This process enables the user to download an image of a document to a computer where the document can be manipulated or amended to the users satisfaction. Following this, the document may be e-mailed, used in an electronic fax transmission or simply printed. Flat bed scanners are an additional option to incorporate into a desk top computer at additional expense. Known flat bed scanners comprise a base unit having a scan area to support a document or object being scanned. The flat bed scanner has a size dependent on the size of document for which the scanner is intended to image. Thus the desk top "foot print" of the scanner can be relatively large. Conventional flat bed scanners have resolutions of the order of 600 dpi, which provides relatively high quality images, and it is common with more expensive prior art scanners to have resolutions higher than 600 dpi.

Known hand-held scanners provide a somewhat less expensive facility for scanning images into conventional personal computers. These usually comprise a hand held device which is passed over the document to be scanned thus recording a digital version of the document. However, hand-held scanners often suffer from lack of quality in that they rely on the user having a steady hand.

Scanners are known in the prior art being used to obtain digital images of a target object. These digital images may be used to recreate an image of the target object on the visual display unit of a users personal computer.

European patent application EP 0840200 A2 describes an interactive desk top system including a camera capturing images present on a work surface. This type of system includes a scanning element in the form of a camera for capturing images. In this example of the prior art the scanning element is a specifically manufactured device forming an integral part of the imaging assembly.

U.S. Pat. No. 5,729,283 describes a reading device for the visually impaired. This device includes specially selected components to form a scanning unit mounted in a housing, positioned above a document placed on a scan bed.

Recently, there have appeared digital cameras which have enabled an individual user to take high quality pictures, stored as digital images which can be downloaded to the users personal computer. This is also the case with digital video cameras. In fact many digital video cameras can be used as a still frame camera as well as for recording moving images.

The resolution of digital cameras is rapidly increasing already being sufficient to capture legible images of A4/US letter pages and text and will soon be able to rival the resolution provided by a flat bed scanner.

SUMMARY OF THE INVENTION

The inventors of the present invention have realized the potential for using digital cameras as scanning devices for obtaining digital images which may be downloaded, viewed and manipulated on a personal computer. The inventors have realized that digital cameras purchased on the high street and those intended for the individual user at home rather than just the professional can be suitably manipulated to perform a document capture function equivalent to the scanning function provided by flat bed and hand held scanners in that a digital image is captured. The inventors have realized that in order to make use of digital cameras in performing a document capture function a suitable stand must be provided which holds the camera in a steady position above the material to be imaged during document capture. To increase the versatility of the stand the inventors have included features of portability and multiple compatibility with a range of digital cameras. Thus the present invention allows the user to improve an existing function or to perform additional functions to those originally intended by the manufacturer of the digital camera. That is, the digital camera may be used as a scanner to capture an image. In this way, a user who owns a digital camera is saved a considerable cost when comparing the typical cost of a flat bed scanning device with that of a stand for supporting a digital camera to perform an equivalent document capture operation.

The inventors have also realized that the present invention removes the need for a fixed amount of space to house equipment to capture an image of a document. That is, a stand for supporting a digital camera to perform the document capture function provides for a small desktop footprint than a flat bed scanner and is further easily removable when not in use. Further, the inventors have realized that such a stand removes the incidental costs, and time taken to familiarize with each device, involved in owning both a digital camera and a scanner.

One object of the specific embodiments of the present invention is to provide a document capture stand to support a digital camera or digital video camera to operate in a document capture mode in obtaining digital images of an object in view of the cameras optic, and thus perform an equivalent function to that of a conventional scanning device.

A second object of the specific embodiments of the present invention is to provide a document capture stand compatible with one or several makes and models of digital camera or digital video camera, the stand enabling the camera to be appropriately positioned above the object to be imaged and enabling focusing of said camera such that a high resolution image can be recorded.

A third object of the specific embodiments of the present invention is to provide a document capture stand with means to configure a digital camera or digital video camera supported by said stand to operate in a document capture mode in recording a high resolution digital image of an object to be imaged.

According to one aspect of the present invention there is provided a stand to hold a digital camera, said stand comprising:

at least one supporting member;

wherein said supporting member has at least one first end;

wherein said first end includes a base portion;

said supporting member having a second end including camera retaining means;

said stand including means for configuring said camera to perform a document image capture function for capture of a digital image of a document.

Preferably said means for configuring includes at least one projection in said retaining means for co-operating with a function switch of said camera.

Said means for configuring further may comprise electrical connections with said camera.

Preferably an action of placing said camera in said stand causes interaction of control switches on said camera with protrusions on said stand, and automatically configures said camera to zoom in or out to catch a predefined scan area, to determine a clarity and resolution of an image formed by said camera and focus the image to enable the camera to be used for performing a document capture function, equivalent to that performed by a prior art document scanner device.

Preferably placing said camera in said stand activates a mode of operation in said camera such that said camera automatically focuses onto a scan area at the base of said stand.

Suitably said retaining means comprises a case adapted to receive said camera and having a plurality of apertures to enable operation of said camera.

Preferably said retaining means is adapted to hold said camera in an orientation and spacing from the base of said stand such that said camera has a view of a scan area of size and shape suitable for placement of an object which is to be the subject of a captured image by said camera.

Preferably said stand includes at least one light source for projecting light to illuminate the object being scanned. The stand may include a plurality of light sources, arranged to illuminate an object plane of said camera in a manner in which light is not reflected directly back at said digital camera.

Preferably a said light is activated by placing said camera into said stand.

Preferably the supporting member is adjustable in height. Preferably the supporting member includes at least one hinge section.

Preferably said base portion comprises means for securing said stand in position.

Preferably said base portion is configured to house an object, which is to be the subject of a captured image by said camera, in a scan area.

Preferably said stand further comprises viewing means to aid camera operation.

According to a second aspect of the present invention there is provided a method of capturing a digital image using a digital camera capable of performing a document image capture function comprising the steps of:

fitting said camera to a stand;
configuring said camera to operate in a document image capture mode;
pointing said camera at a document which is to be the subject of a captured image; and
operating said camera to record a digital image of said document.

Preferably the method further comprises the steps of:
connecting a means for downloading at least one recorded digital image to aid camera;
connecting said downloading means to a computer;
configuring said camera to send said at least one digital image to said computer, and
configuring said computer to receive said at least one digital image.

Preferably said step of configuring said camera to operate in a document capture mode occurs automatically on fitting said camera to said stand by physical contact of a switch element on said camera with said stand. Said step may comprise:
configuring said camera's optic to zoom in or out to capture a predefined scan area;
determining the clarity and resolution of the image formed by said camera;
focusing the image received by said camera.

Preferably said step of configuring said camera to operate in a document capture mode occurs automatically on fitting said camera to said stand by physical contact of a switch element on said camera with said stand, said step comprising:
adjusting the focal length of said camera to a predetermined length, said predetermined length being a distance between a scan area at the base of said stand and a position of an image plane of said camera when secured within said stand.

Preferably, the method further comprises the step of:
operating and positioning a light source on said stand to illuminate the object being scanned.

Preferably, the method further comprises the step of processing said image to optimize the image clarity and quality.

According to a third aspect of the present invention there is provided a system for capturing digital images of a document, said system comprising:
a digital camera;
a stand to support said camera; and
a computer,
wherein said stand includes at least one supporting member, a base member for securing said supporting member in an upright orientation, and a camera retaining means for rigidly securing said digital camera, said stand supporting said camera in a position suitable for operation of said camera in recording a digital image of said document.

Preferably placing said camera into said stand automatically configures said camera to zoom in or out to capture a predefined scan area, to determine a clarity and resolution of image formed by said camera and to focus the image to enable said camera to be used as a scanner capable of performing a document capture function.

Preferably placing said camera into said stand activates a mode of operation in said camera such that said camera automatically focuses onto a scan area at the base of said stand.

Preferably said retaining means is adapted to hold said camera in an orientation and spacing from the base of said stand such that said camera has a view of a scan area of size and shape suitable for placement of an object which is to be the subject of a captured image by said camera.

Preferably, the system further comprises means for electrically connecting said camera to said computer to enable downloading of digital images from said camera to said computer.

Preferably said stand further comprises at least one light activated by placing said camera into said stand.

Preferably said computer includes means for processing images captured by said camera to optimize the image clarity.

Preferably said computer includes means for processing images captured by said camera to optimize the quality of monochrome images obtained using a color image sensor.

In all aspects of the present invention said digital camera may be a digital video camera. The digital camera is detachable from said stand and usable in a stand alone context.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will no be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Prior art digital cameras use arrays of charge coupled devices (CCD's) to receive images which may be stored electronically. This process of recording light images in an electronic manner means that the images can be recorded in a digital format. Thus, the images recorded can be downloaded to computer systems, for instance a personal computer system and by using appropriate software the image can be manipulated to a user's desired preference and then printed through a connected printer. Such prior art digital cameras are available to the public both in high street stores and through specialist outlets. Such prior art cameras are intended as replacements for conventional film cameras for domestic use, e.g. landscape photography, taking pictures of family and friends and the like. Although still developing, the quality and resolution provided by digital cameras is considerable. In the near future the resolution provided by such digital cameras will be sufficient to accurately record a digital image of all features of, for instance, a printed page or photograph. With this in mind the inventors have realized that a digital camera may be adapted to perform a document image capture function equivalent to the scanning function performed by prior art document scanners.

Prior art document scanners are commonly associated with personal computer systems in order to transfer information from a paper based format to a digitally recorded format which can be manipulated on screen. The inventors have realized that by adapting the use of a standard digital camera to perform a scanning function considerable expense may be avoided in that a user need only purchase one device for recording digital images which may be used either as a portable camera or when used in conjunction with an appropriate stand subject of the present disclosure, as an image capture device suitable for document images. Further the inventors have sought to reduce the desk top foot print area of equipment required to capture an image of a document and download that image to a computer.

The inventors have realized that in order to perform both the functions of a standard camera and a scanning device a digital camera is expected to require resolution in the order of at least 50 dots per inch and preferably more than 100 dots per inch at a distance of approximately ½ meter from an object which is being imaged. In order to accurately use a digital camera to scan an object the inventors propose a stand to locate the camera at a suitable distance from the object being imaged such that a detailed image of the object can be obtained. To ease usage, such a stand should lock the camera in position, activating any necessary modes of operation required to perform a document capture function. Operation of the camera to take a picture of the object being imaged may result in the image being directly downloaded to a personal computer system or other computer network by appropriately attached wires, cables etc. Alternatively, the image may be stored in a memory means within the camera and downloaded at a later date.

Although specific embodiments of the invention provide for a multi-purpose stand suitable for housing a number of different types of digital camera, it is also understood that changing the retaining means for housing the digital camera on the stand may allow different shapes, sizes and types of digital camera to be adapted to perform a document image capture function when in conjunction with an appropriate stand.

Figure 1:
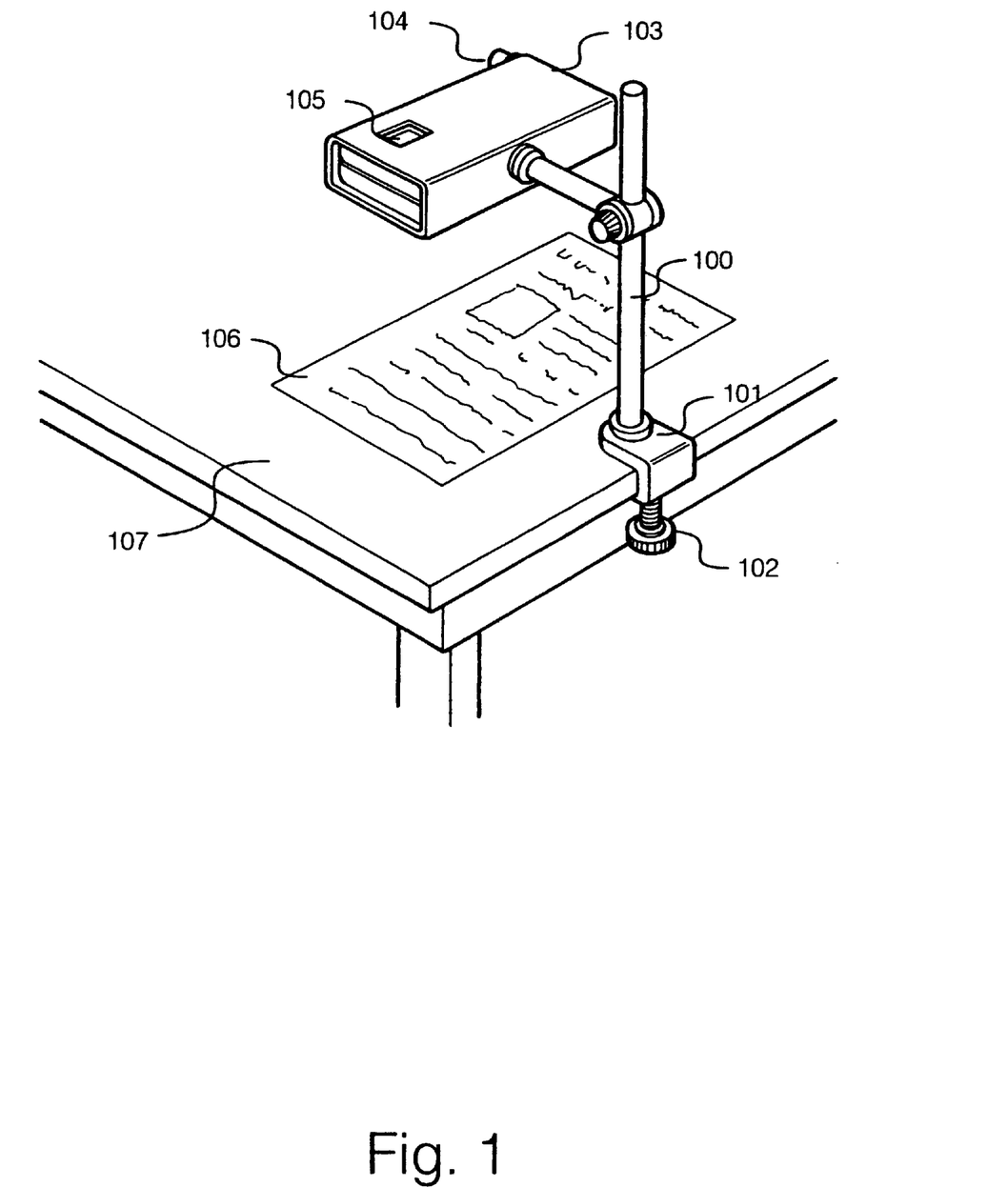
FIG. 1 shows a document capture stand clamped in position on a table such that a digital camera can be mounted above an object to be imaged.

Referring to FIG. 1 herein, there is illustrated a first stand according to a first specific embodiment of the present invention, supporting a digital camera in performing a document image capture function. The digital camera may comprise a photographic camera suitable for taking still images, or a video camera. The first stand comprises an upright support member 100 having a first upper end and a second lower end. At a first end of said support member 100 there exists a base portion comprising a clamping means for attaching the stand to a table or work surface. Said clamping means 101 is secured using a screw fastening means 102. The first stand further comprises a retaining means 103 extending on an arm transverse to a main length of upright support member 100, the retaining means configured to enclose a digital camera. Tightening the screw fastening means 102 results in two planar plates attached to support member 100 and appropriately located on an upper and lower surface of the table or work surface to be urged together and thus securely grip the table, work surface etc. In this way the stand is firmly held in position rigid relative to the table, work surface or the like, such that a digital camera can be located in the retaining means 103 such that it will remain substantially stationary facilitating operation of the camera in obtaining an image of an object to be imaged 106. Retaining means 103 is located between the first and second ends of support member 100, and is adjustable along the length of support member 100.

Retaining means 103 comprises a case or boxed housing in which a suitable digital camera can be placed by either sliding said camera into the retaining means from one side or from above or below. This may be facilitated by suitable hinge sections within the retaining means forming flaps or apertures when open allowing for insertion of the digital camera. The retaining means further comprises upper and lower apertures 105 to support viewing of the object through the camera view finder. An aperture or button 104 is also provided located adjacent to a trigger on the digital camera housed within the retaining means 103. Said aperture or button 104 provides a means to operate the digital camera in taking a single picture of the object being imaged 106. FIG. 1 thus illustrates a portable document capture stand which may be set up on a suitable work surface e.g. a table top to fixedly support a digital camera at an appropriate height above an object to be imaged 106 such as a paper based document e.g. a letter. The stand further allows for focusing by viewing the object 106 through a view finder means 105 and providing access to camera focus controls and further provides a means for taking the picture, hence capturing an image of the object, through aperture or button 104.

In the first specific embodiment a main support member 100 extends between a first end and a second end. At a first end of said support member 100 there is provided a means to balance and support the document capture stand in a stable position to house a digital camera in order that it may be operated to record digital images of documents etc. of such a quality to be equivalent to that obtained by commonly known scanning units. Said means to balance and support said document capture stand may comprise a clamping mechanism wherein two plates projecting perpendicularly from said supporting member may be used to clamp an upper and lower surface of a bench, tabletop work surface etc. A fastening means e.g. a screw fastening means 102 provides for tightening of the clamping mechanism. When securely in position supporting member 100 supports the document capture stand in a vertically upright position enabling a digital camera to be located in a retaining means 103 for operation as a document capture unit. At a second end of said supporting member 100 there is provided a retaining means 103. Said retaining means fixedly supports and locks in position the digital camera to be used in obtaining digital images. Said retaining means may exist in one of a number of forms. In a simplistic format, said retaining means 103 may exist as a screw tightening support mechanism locating with an appropriate thread on the digital camera to be used. Alternatively, the retaining means may take the form of a shoe locating with the camera to fixedly support and lock in position the camera during use. The retaining means 103 is provided in the form of a boxed format comprising a substantially rectangular frame suitable to house a digital camera. Such retaining means may be easily detachable from the supporting member 100. This means that a combination of supporting member 100 with one of a number of retaining means 103 which may be suitable to support one or several different makes/models of digital camera is accommodated. Retaining means 103 may be formed from a plastic molding for instance. In this way a digital camera may be pushed into a recess in the plastics molding being secured by a snap fit mechanism. By selecting the correct type of retaining means for a particular make/model of camera this ensures that when in position in the retaining means 103 the view finder is accessible to the user so that the image in view of the camera can be seen. Additionally, controls to operate the digital camera are accessible, in particular the operating control, typically a button, which is pressed to take a single picture.

In the first embodiment the supporting member 100 is fully adjustable in height and may include telescopic portions to accommodate this. Further, optional hinged sections within the main supporting member 100 may allow for the angle of the digital camera with respect to the work surface on which the object to be imaged 106 is placed to be adjusted. Inserting the digital camera into retaining means 103 and securing said digital camera e.g. by a snap fit mechanism or by appropriate clips, straps etc. allows for the user to view the object 106 through the view finder 105 and to operate the digital camera in taking a single picture by depressing an operating means located on said camera. This may be effected through buttons or projections on the retaining means. An extended view finder 203 (FIG. 2) may be incorporated with retaining means 103 to enable ease of use of the document capture stand such that the user can easily view the object to be scanned 106.

In the first embodiment of the present invention operating the digital camera to record a single digital image of the object to be scanned 106 results in the digital image being recorded on a memory means within the digital camera. The camera may be removed from the retaining means, transported elsewhere if necessary before downloading the image to a computer system such as a personal computer.

Figure 2:
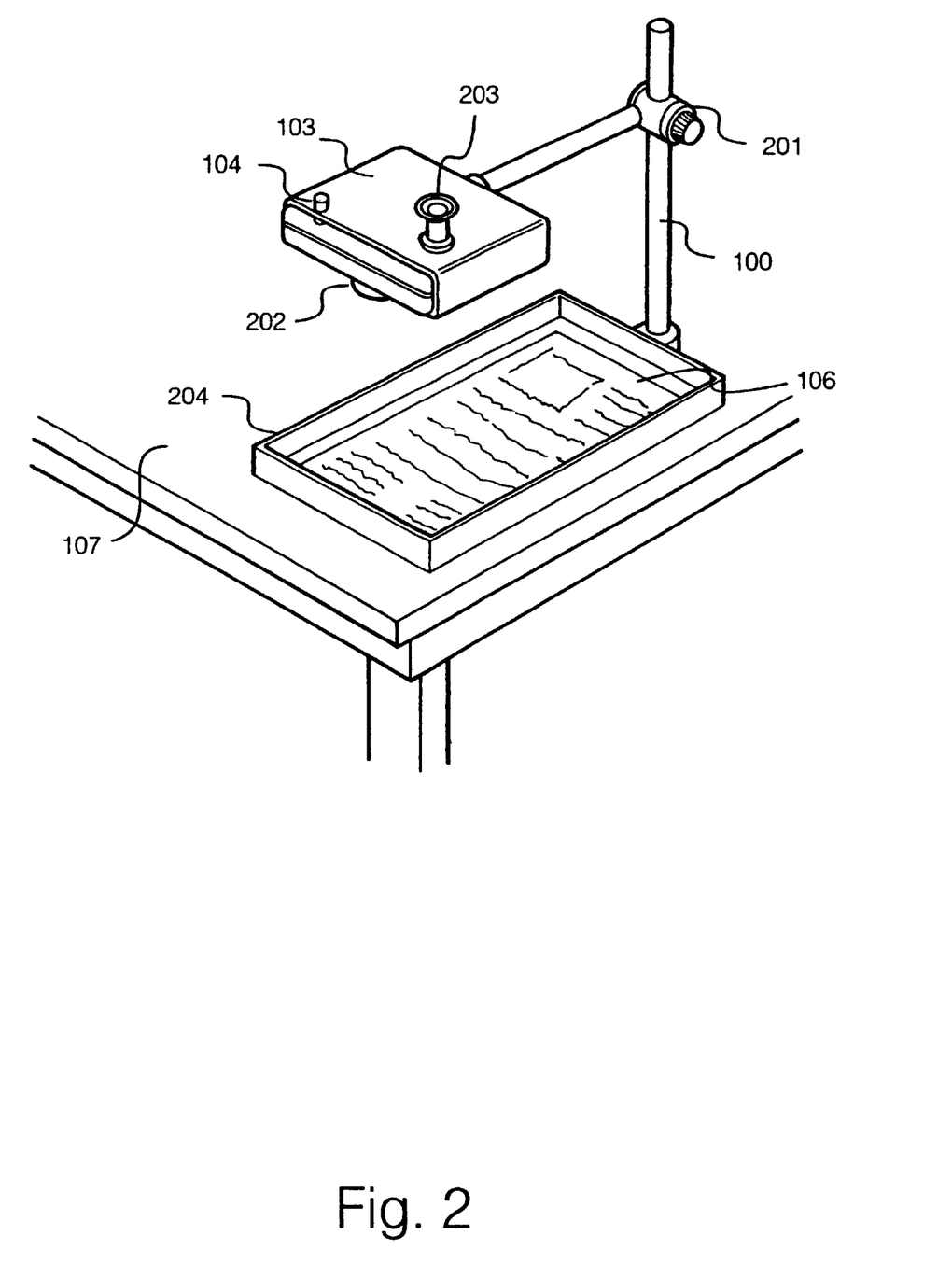
FIG. 2 illustrates an alternative document capture stand including a base section to house the object being imaged and an extended view finder to aid use of the digital camera in obtaining a suitable image.

FIG. 2 shows a second stand according to a second specific embodiment of the present invention. Here a base portion 204 is present at a first end of a support member 100. The base portion takes the form of a rectangular tray in which the object to be imaged may be placed. Base portion 204 may contain markings indicating to the user the appropriate positioning of the document etc. to be imaged in order to obtain an image of the whole document, i.e. defining a scan area. That is, such that, for instance, the head or foot of the document is not missed when the digital image is recorded by digital camera 202. Within the supporting member 100 a hinge section 201 is illustrated. This provides for movement of the digital camera above the base section 204 and thus accommodates for the variation in optic placement within a number of digital cameras. Supporting member 100 may further be telescopic in nature and allow for adjustment in height of the retaining means 103 and camera 202 above the base section 204. This is designed to aid focusing of the object to be imaged 106 and therefore aids the forming of a high quality image. Retaining means 103 further comprises an extended view finder 203 locatable above the view finder of the digital camera 202. This is designed to aid use of the document capture stand such that the user can easily view the picture to be taken by the camera.

Figure 3:
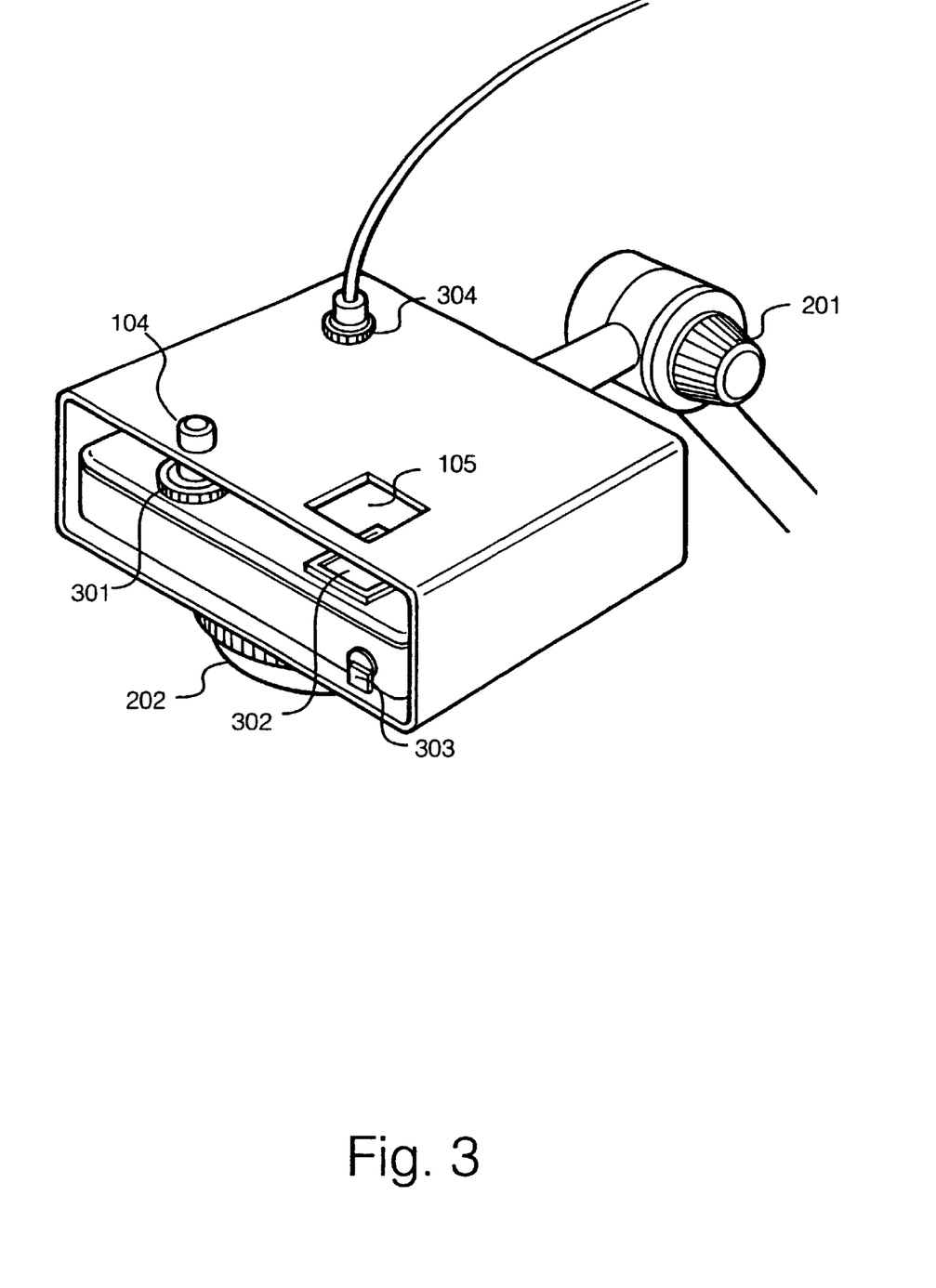
FIG. 3 illustrates one form of retaining means including suitable apertures, abutments/projections and buttons for use in configuring and operating the digital camera during document capture.

FIG. 3 illustrates a close up of one possible form of retaining means 103. The retaining means comprises a substantially tabular box section housing into which a camera may be positioned. Here, an aperture 105 is provided in an upper wall of the housing to aid viewing, and a button 104 is provided to operate the camera 202 in taking a picture by depressing a camera operating means 301. A further aperture is provided in the housing wall to allow an electrical connection to be formed through a suitable socket 304. Such a socket may be plugged into an appropriate electrical connection on the digital camera and thus allows for connection of the camera by means of wires and cables etc. to an external processing unit such as a personal computer. This is required when the image being recorded is required to be directly downloaded to a computer system. Any other available interface to the camera 202 could be used in a similar manner—for example, optical, magnetic or radio signals could be passed to a suitable interface in the camera by appropriate means associated with the stand. A further modification of retaining means 103 is shown by projection 303. This projection forms an abutment specifically placed within the housing wall of retaining means 103 to be located with a suitable button or other switch etc. on the camera when the camera is positioned in the housing to provide a specific command. For instance, this command may be to configure the camera to operate in a mode suitable for recording images of a required resolution and quality for image capture and downloading to a computer system. That is, to configure the camera to operate in a document capture mode. It is appreciated that different makes and models of digital camera include buttons, switches etc. for operating different modes in a variety of locations. Hence, the scanning stand is designed to be compatible with one of a number of retaining means. A particular retaining means is suitable to house one or a number of makes and models of digital camera. Each retaining means therefore has one or a number of abutments/projections for locating with specific buttons, switches etc. on these different makes and models of digital cameras to operate a certain mode in order to operate the digital camera in a document capture mode. This may be achieved by having a number of abutments/projections on an individual retaining means wherein when one make of digital camera is inserted only one of the abutments/projections locates with an appropriate button/switch to operate a particular mode. The other abutments/projections do not perform a function whilst that particular make and model of camera is being used. Conversely, inserting a different make and model of digital camera can use a separate abutment/projection to operate a particular mode of operation of the camera.

Further referring to FIG. 3, the retaining means 103 is shown as a stylized box unit. This unit may comprise a large number of apertures suitable such that the user can reach and operate all of the various functions of the digital camera in operation. Such a large number of apertures means that the retaining means 103 is considered more like a frame than a box with filled panels. Apertures, hinge sections and flaps may further provide for insertion of the digital camera whilst clips, snap fit mechanisms, buckles or screw fastening means may provide for secure housing of the digital camera. Movement of the digital camera is thus provided for by the combination of hinge sections 201 and means to adjust the height of the supporting members, such as telescopic means.

Figure 4:
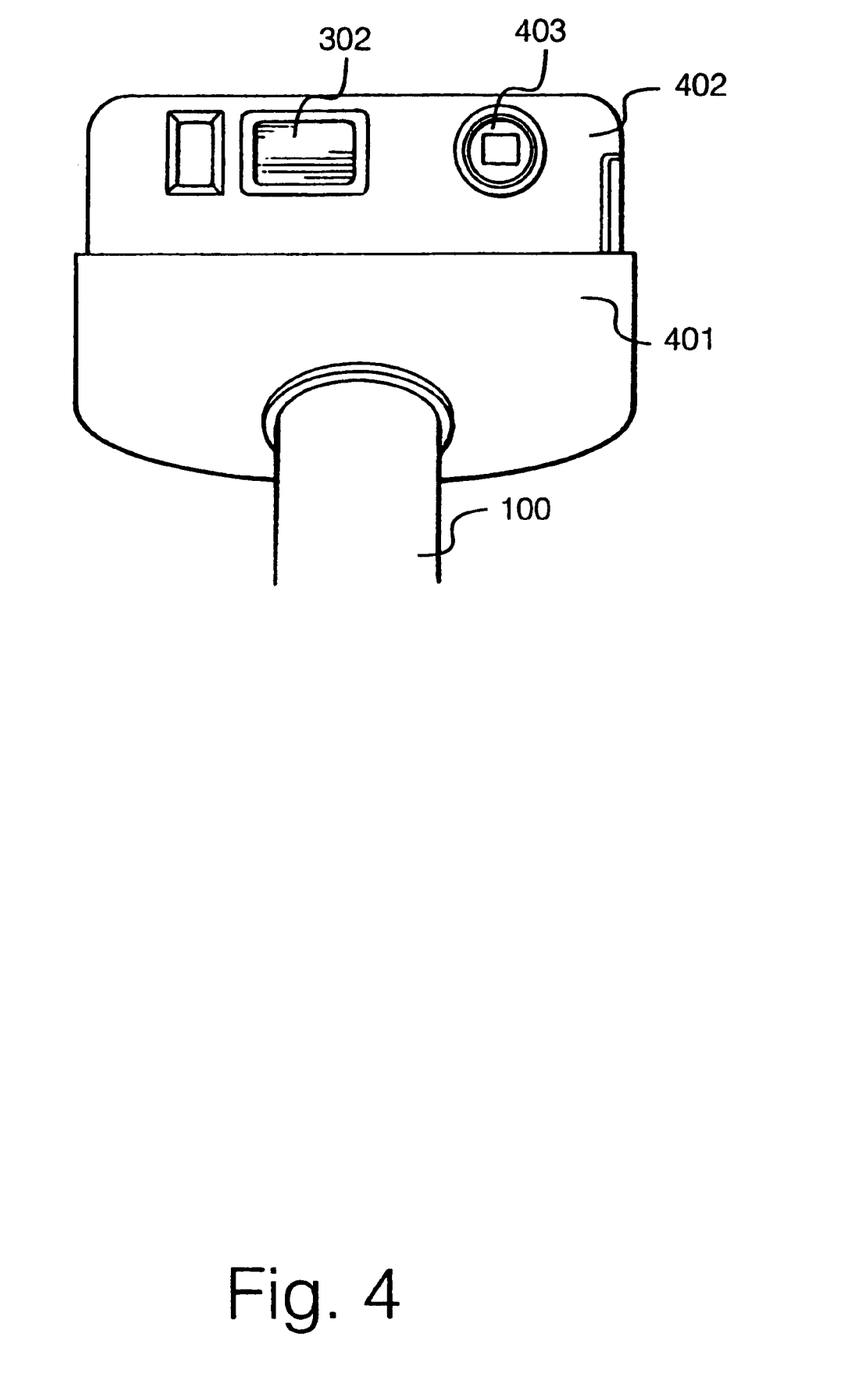
FIG. 4 illustrates an alternative form of retaining means showing a view from the back of the camera.

FIG. 4 is an illustration of a second retaining means comprising a substantially cradle shaped plastics molding 401 housing a camera 402. FIG. 4 illustrates the second retaining means from a rear view illustrating the accessibility of view finder 302 and camera operating means 403.

In use, a digital camera 402 is placed in the cradle shaped plastics moulding 401, such that the plastics moulding fits closely around a lower part of an outer casing of the camera. The plastics moulding may be designed to be of a specific shape for a particular model of camera, thereby closely fitting the outer casing of the camera, or may be of a resilient, deformable plastics material, adaptable to a plurality of different camera types.

Figure 5:
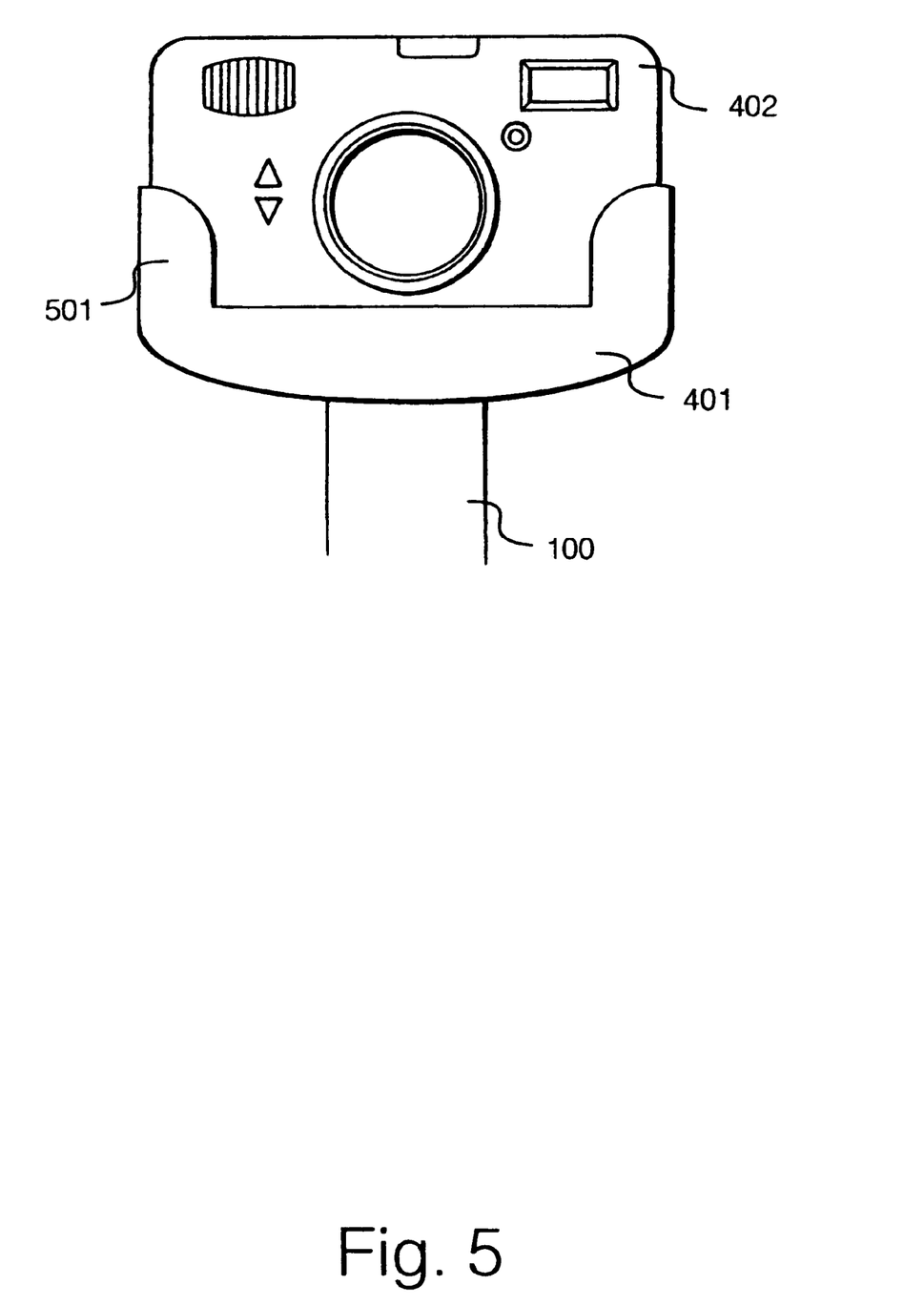
FIG. 5 shows an alternative retaining means and camera showing a view from the front of the camera.

FIG. 5 illustrates the retaining means and camera of FIG. 4 from a front view of the camera. Retaining means 401 may be formed of a plastic molding allowing camera 402 to be held in position by a snap fit mechanism wherein the plastics molding expands as the camera is pushed into position and then contracts around the camera once the camera is in position. Retaining means 401 may have projections 501 which may have further abutments or projections on the internal surface of the retaining means designed to mechanically activate buttons on camera 402 to initiate the document capture mode of camera 402.

Retaining means 103 may comprise means for configuring the digital camera. These may be in the form of specific abutments/projections. Considering a plastic molding as the retaining means 103 such abutments/projections may be integrally molded in specific positions. On placing the digital camera into retaining means 103 securing by a previously described snap fit or other mechanism, abutments/projections locate with specific buttons, switches etc. mechanically depressing these buttons, switches etc. on the camera. A single retaining means may be designed to house a number of different makes/models of digital camera wherein a number of abutments/projections exist on each retaining means with only one or a plurality of said abutments/projections being in use at any one time. These abutments/projections provide means for configuring individual digital cameras by instructing the camera to modify its use of the optic and imaging algorithms into a document capture mode. The effect is that the digital camera is able to determine that it is in the stand and can configure itself, by means of pre-stored instructions to enter a mode of operation for capturing images of documents.

Additional integral components of the retaining means 103 may include electrical connections in the form of ports, sockets etc. These provide for an interface between the digital camera and the stand which may be further connected by means of wires etc. to an external computer system e.g. the desktop personal computer. This means that on placing the digital camera into position not only are means to enable camera operation located correctly, such as the extended view finder 203, buttons 104, apertures 105 etc. but electrical connections are made which allow the user to immediately download images to a personal computer by means of appropriately connected wires and cables. In this way, the digital camera may be instructed to bypass its own memory means and download image data directly to a computer device. This means that the number of "scanned" images produced by the camera, through document capture, at any one time is not dependent on the size of its memory means, but is more dependent on receiving a continuous power source. Although this will commonly be supplied by a battery located within the digital camera, the retaining means 103 may provide further electrical connection means to provide input of an external power source to the camera. A further advantageous possibility is for an electrical connection to be provided in the retaining means 103 to enable the battery located within the digital camera to be recharged.

Interaction with the camera mediated by the retaining means 103 is not limited to that necessary to achieve correct camera location, or to allow downloading of images to a personal computer (or other appropriate appliance). A particularly desirable use for such further interaction is to enable image capture and processing to be optimized for document capture. The requirements of document capture are very different from those of scene capture, particularly in relation to text. Features that may benefit from optimization for document capture are aperture, shutter speed, flash illumination, white balance and image sharpening. Means (whether by setting of manually activated buttons, by switches operated electrically or otherwise, or by interaction with the operating system of the camera) to set one or more of these features for optimal document capture can further improve the achievable performance.

In embodiments of the present invention a light source may be included as part of the document capture stand operable by a control means present on part of the stand e.g. supporting member 100. The light source may be adjustable in position such that the object being imaged can be illuminated to allow high quality, high resolution digital images to be recorded by the digital camera housed within the document capture stand.

Figure 6:
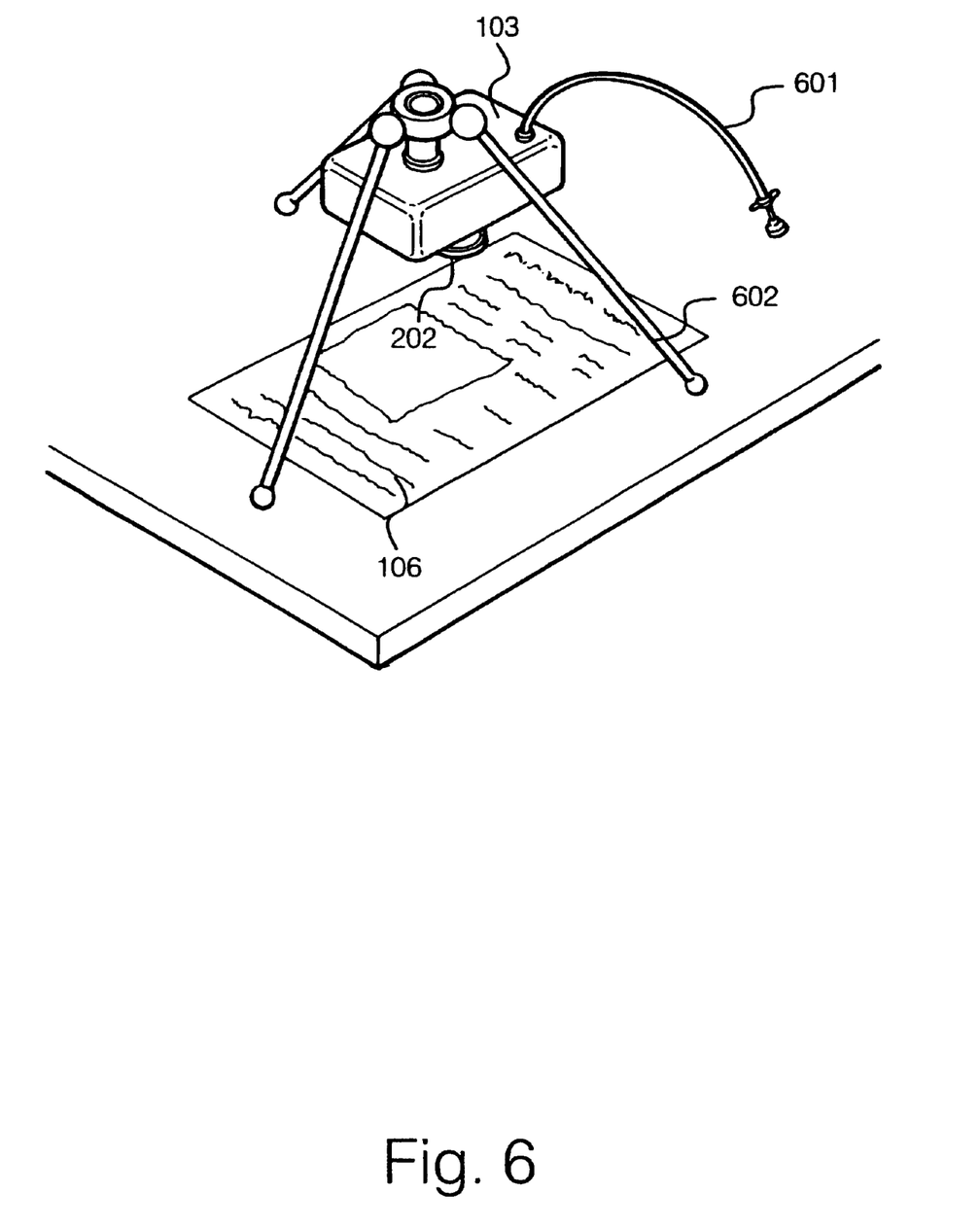
FIG. 6 shows an alternative type of document capture stand wherein the camera and retaining means are supported by a tripod structure.

FIG. 6 shows a third stand according to a third specific embodiment of the present invention, which illustrates a general principle of maintaining a digital camera at a suitable position above an object to be imaged 106 such that a high resolution digital image may be formed which is suitable for downloading to a personal computer system. This tripod based stand includes three supporting members 602, each of which may be telescopic in nature to allow an adjustment in height for appropriate focusing etc. of the digital camera 202. Each supporting member has a base portion at a first end comprising a foot. An extended view finder means can be incorporated to aid viewing of the picture to be taken. Further illustrated in FIG. 6 is an alternative means of operating the digital camera 202. This is provided by remote operating means 601 connected to the retaining means 103. This may be in the form of a flexible wire containing a central rod connected to a plunger. Depressing the plunger mechanically presses a button on the camera instructing the camera to take a single photographic image. This type of operating means is equivalent to that known to be used on many prior art analog cameras.

Figure 7:
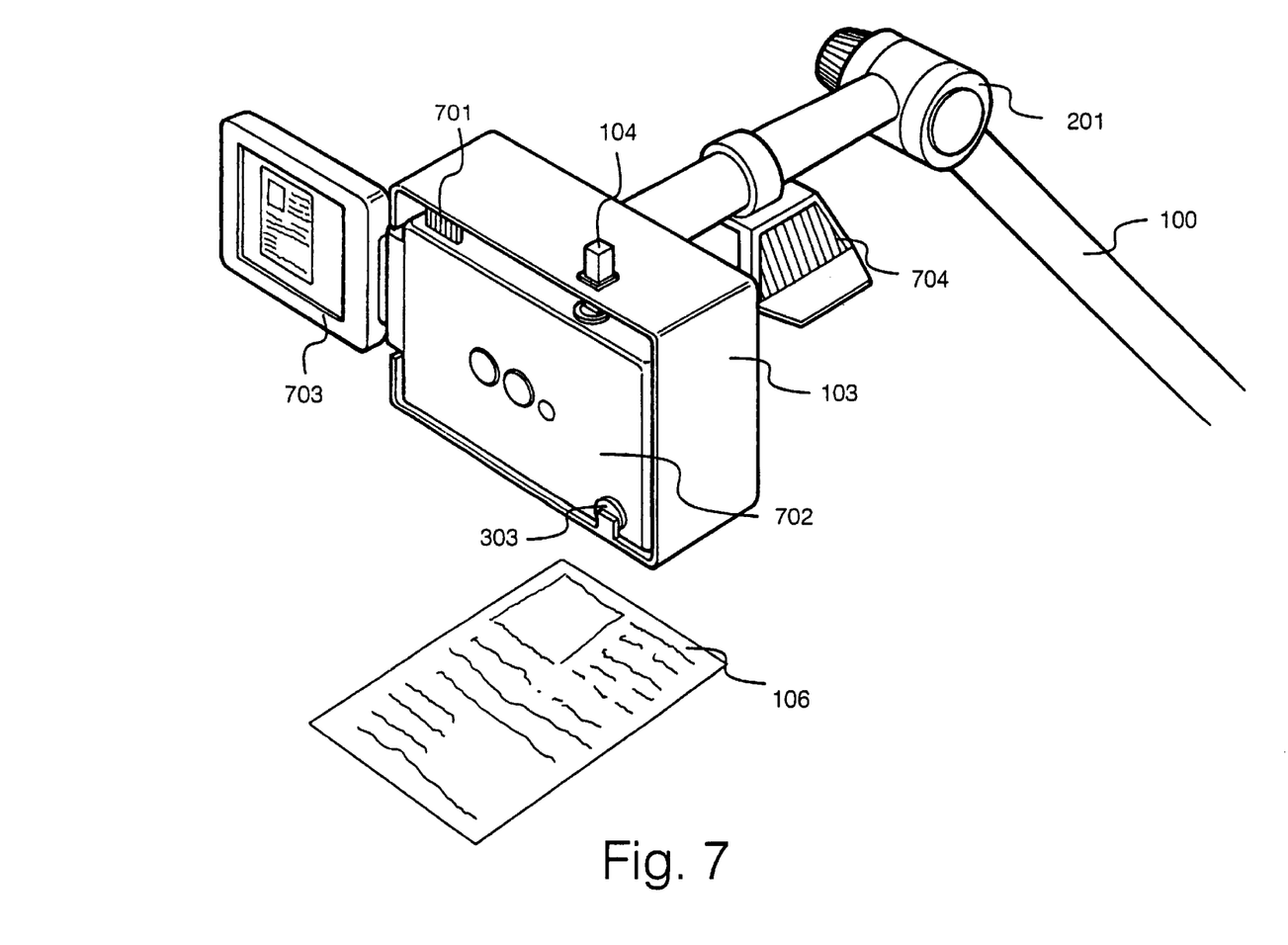
FIG. 7 illustrates a document capture stand with retaining means suitable for retaining a digital video camera for use in imaging an object. Further illustrated as part of the stand is a light source 704.

FIG. 7 shows a feature of a fourth stand according to a fourth specific embodiment of the present invention, which is suitable for housing a digital video camera for use in operating as a document capture device. The stand includes supporting members 100 which may attach to a base portion or clamp at a first end. Suitable hinges etc. are provided to adjust the position of the digital video camera. A retaining means 103 is provided in a similar manner to the stands described in FIGS. 1 to 6 herein. Retaining means 103 provides for housing of a digital video camera. Such cameras are commonly operable to record still frame images as well as moving images. Abutments/projections 303 exist within retaining means 103 to configure the digital video camera to operate in a mode to record still frame images of a quality suitable for downloading to a personal computer and comparable to that obtained by a conventional scanning unit. Viewing means may be provided in the form of apertures etc. However, digital video cameras commonly have a fold out liquid crystal display monitor on which the image being viewed by the camera can be seen. To accommodate this, retaining means 103 has suitable apertures to allow the screen 703 to be viewed by the user. In this way, the image to be recorded can be easily viewed by the user. Button 104 is provided to activate operation of the digital video camera in still frame mode ie to take a picture. Electrical connection 701 may provide for connection of the digital video camera and stand to a computer by appropriate wires etc. (not shown), in a similar manner to that described for FIG. 3. Abutment/projection 303 and buttons 104 may be appropriately placed on a retaining means 103 to suit an individual make or model of camera. However a number of retaining means may exist all compatible with a single form of stand. The user simply has to choose, on purchasing the stand, the appropriate form of retaining means to suit the type of camera to be used. Each retaining means may however be suitable for use with a number of makes and models of digital video camera.

Illustrated in FIG. 7 is a light source 704. This is illustrated as being part of the supporting member 100. Alternatively, the light source may be placed adjacent to or as part of the retaining means 103 etc. The light source is an electric lamp of suitable power to provide illumination of the object being scanned 106. The light source may be manipulated such that the light projects in one of a plurality of directions to provide appropriate illumination of the object to be scanned. Electrical connections including wires etc. may be provided within the supporting member 100 being linked to operating means e.g. a switch and further linked to a power source through a domestic type plug and socket.

The light source described above may comprise more than one individual light source. The use of two light sources can provide for more constant light distribution across the document to be imaged. Each light may further be located on moveable arms which may be positioned at points distant from the camera and retaining means to suitably illuminate the document to be imaged thus preventing reflection of light being seen on the document during imaging by the camera.

In a fourth specific embodiment there is a document capture stand incorporating all of or a combination of the features of both the first, second and third specific embodiments of the present invention. As shown in FIG. 7, the retaining means 103 has been adapted to support housing of a digital video camera. Abutments/projections 303 provide means for configuring the digital video camera in a document capture mode, button 104 provides a means to enable camera operation and electrical connection 701 provides a means of connecting the camera to a personal computer system via appropriately connected wires and cables. The means for configuring 303 not only places the camera in a mode where the use of the cameras optic and imaging algorithms are adapted for scanning but further places the digital video camera in a mode for recording still frame images rather than moving frame images. The digital video camera 502 may be located in retaining means 103 by a snap fit mechanism or by appropriately placed clips, straps etc. However, the commonly incorporated liquid crystal display screen 703 is appropriately free of the retaining means such that it may be viewed by the user and hence facilitates the user in obtaining the required image. For digital video cameras not including such an LCD screen an appropriate aperture through which the view finder can project may exist.

Figure 8:
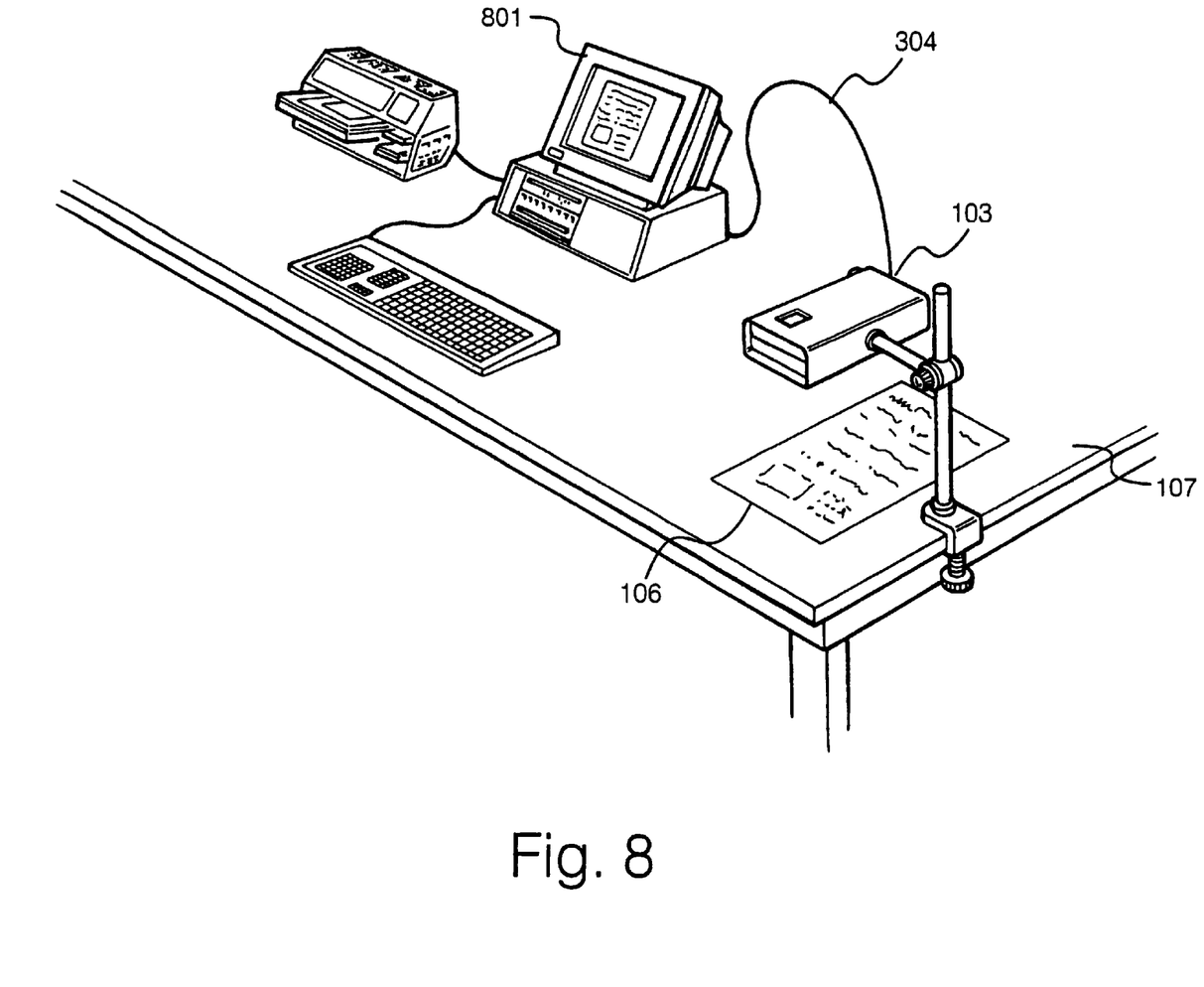
FIG. 8 illustrates a system suitable for using a digital camera for document capture and downloading of the image obtained to a personal computer where the image may be refined or amended and may further be printed or used in an electronic form of communication.

FIG. 8 illustrates an imaging system according to a fifth specific embodiment of the present invention. The document capture stand is provided in which a digital still camera or digital video camera can be placed in retaining means 103 to take a still frame image of the object 106. A plurality of adjustable light sources, similar to light source 704, may be required to provide appropriate illumination. These light sources can be operated by an operating means, e.g., a switch. An image obtained by a camera within retaining means 103 can be downloaded by wires 304 to a personal computer 801 which can adjust, manipulate, etc., the obtained image. The image can also be recorded on a portable recording medium, e.g., a computer disk of computer 801. Alternatively, the downloaded image can be reprinted through an associated printer or can be distributed to other users via electronic communications, e.g., e-mail or computer fax systems.

It is known in the prior art for digital cameras to provide the home user with the opportunity to simply and relatively cheaply apply a number of effects to their pictures. This is due to the ability of prior art digital cameras to incorporate a number of modes of operation. Such modes of operation are achieved by utilization of one of a number of specific imaging algorithms. One of the types of mode into which digital cameras can be placed is that of a document capture mode. The document capture mode sets up the camera such that the camera is configured to provide a high quality of resolution over images a short distance away. Resolution of digital cameras is further increasing, but the inventors expect that a resolution of at least 100 dots per inch at a distance of ½ meter will provide suitable resolution to obtain images of documents, etc., such that a digital camera can operate to perform functions equivalent to those of a prior art scanner. To obtain higher quality imaging, resolutions of 600 dpi or more are required. Considering prior art digital cameras the inventors have realized that the shortest distance between camera lens and object to be imaged is presently approximately 0.23 meters considering the image to be an A4 size document. Combined with a resolution of 135 dots per inch a six point text could be imaged to provide a legible image when downloaded to a computer. Operation of the document capture mode modifies the camera to make use of its optic in an appropriate manner. Hence, by placing a digital camera or digital video camera in an appropriate mode the camera can be used to obtain images of documents or pictures etc. which may be downloaded to a computer system. This facility is equivalent to that provided by prior art scanning devices such as flat bed scanners. To facilitate the use of digital cameras in this manner the inventors have provided a document capture stand which may take one of several forms detailed in the embodiments herein described above.

Figure 9:
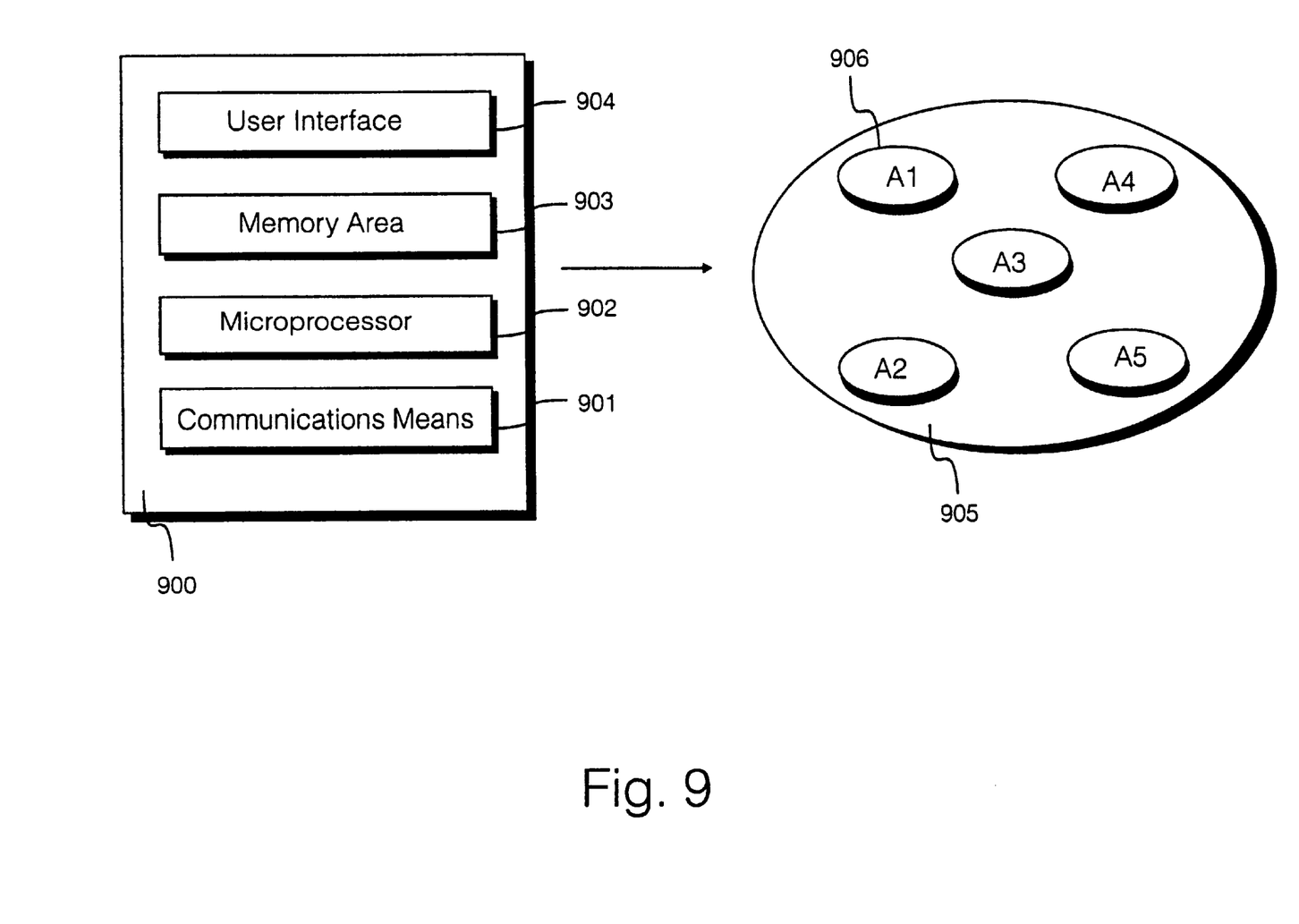
FIG. 9 shows a representation of image processing algorithms within a computer.

FIG. 9 illustrates in high level view a physical and logical architecture of the functionality of the fifth embodiment of the present invention. Computer hardware 900 is shown to consist, among other components, of a communications means 901 to accommodate downloading of information from an external source, in this case a digital camera or digital video camera; a micro-processor 902; memory area 903 and a user interface 904. Memory area 903 and micro-processor 902 can combine in operation to process downloaded images captured by a digital camera and input via communications means 901. In combination, memory area 903 and micro-processor 902 comprise a logical entity 905 which may operate by means of a number of specific image processing algorithms to improve the clarity and quality of the downloaded image. Such improvements in clarity and quality may include sharpening individual characters within text, removing background noise etc. Although some digital cameras may incorporate text capture modes that provide an initial processing of the image to improve clarity and quality of the image incorporation of these algorithms within the computer means that image processing can occur regardless of the make or model of digital camera used. One example of a specific processing algorithm would be an algorithm directed at optimizing the image obtained from a color image sensor on the digital camera where the image itself is largely monochrome as will often be the case where a letter or page of text is the object imaged by the digital camera. A second specific algorithm may compensate for the spatial and temporal variation in intensity of ambient lighting illuminating the object which is to be imaged.

In the fifth embodiment of the present invention the personal computer provides the processing power and algorithms where the digital camera is configured to output image data directly following document capture and does not rely on the digital camera processing the image. By manipulating the computer to appropriately select the correct algorithm(s) 906 the downloaded image can be processed accordingly. A further modification to the retaining means may involve further abutments/projections acting as switches which when in combination with a personal computer and connected by appropriate wires and cables allows the computer to determine what make and model of camera is connected and therefore enables the computer to utilize the appropriate imaging algorithms to process the results accordingly. This may be achieved by transmission of an identification sequence to the personal computer on placing the camera into the retaining means.

The embodiments described herein above provide for a portable document capture stand which need not be a permanent fixture on the work surface and can be rapidly erected and put into functional use by appropriately placing a digital camera in the retaining means 103. Once in position the camera can be used to rapidly "scan" documents, pictures etc. by recording single still photographic digital images and either recording in a memory means within the camera or immediately downloading to a computer network system. When the user has finished the required document capture operation the document capture stand can be removed from the work surface by unclamping a clamp fastening mechanism 101 or simply by lifting the base section and stand as a whole. The stand may therefore be stored whilst not in use and the digital camera may be removed from retaining means 103 and used externally of the document capture stand to take still frame photographic digital images at the users convenience.

It should be noted that although the embodiments here described mainly indicate configuration of the camera by means of the stand through cooperation between projections associated with the stand and switches of the camera or through electrical connections made to the camera, other configuration means are available. Optical means may be provided, either to change the optical path between the camera and an imaged document or to provide an optical connection as an alternative to electrical signal communication with the camera. Magnetic means may also be provided to activate camera switches. Other means to communicate with the camera, such as wireless or infrared, could also be used if these are supported by the camera itself.

All of the embodiments described herein include document capture stands of basic design, simply supporting a digital camera including digital video cameras for operation as a document imaging device independent of a personal computer unit as well as stands increasing in complexity including features such as a light, means for configuring the camera in a document capture mode, electrical connections, buttons and apertures providing a means to enable camera operation etc.

What is claimed is:

1. A stand to hold a digital camera, said stand comprising:
   at least one supporting member;
   wherein said supporting member has at least one first end;
   wherein said first end includes a base portion;
   said supporting member having a second end including a camera retaining means;
   said stand including means for configuring said camera to perform a document image capture function for capture of a digital image of a document,
   wherein placing said camera in said stand automatically configures said camera to zoom in or out to catch a predefined scan area, to determine a clarity and resolution of image formed by said camera and focus the image.

2. The stand as claimed in claim 1, wherein said means for configuring includes at least one projection in said retaining means for co-operating with a function switch of said camera.

3. The stand as claimed in claim 1, wherein said means for configuring further comprises electrical or optical connections with said camera.

4. The stand as claimed in claim 1, wherein placing said camera in said stand automatically configures said camera according to image capture parameters optimized for document capture.

5. The stand as claimed in claim 1, wherein placing said camera into said stand activates a mode of operation in said camera such that said camera automatically focuses onto a scan area at the base of said stand.

6. The stand as claimed in claim 1, wherein said retaining means is adapted to hold said camera in an orientation and spacing from the base of said stand such that said camera has a view of a scan area of size and shape suitable for placement of an object which is to be the subject of a captured image by said camera.

7. The stand as claimed in claim 1, wherein said stand includes at least one light source for projecting light to illuminate an object being scanned.

8. The stand as claimed in claim 1, wherein said stand further comprises at least one light activated by placing said camera into said stand.

9. The stand as claimed in claim 1, wherein said at least one supporting member is adjustable in height.

10. The stand as claimed in claim 1, wherein said at least one supporting member includes at least one hinge section.

11. The stand as claimed in claim 1, wherein said base portion comprises means for securing said stand to a surface.

12. The stand as claimed in claim 1, wherein said base portion is configured to house an object, which is to be the subject of a captured image by said camera, in a scan area.

13. A stand to hold a digital camera, said stand comprising:
   at least one supporting member;
   wherein said supporting member has at least one first end;
   wherein said first end includes a base portion;
   said supporting member having a second end including a camera retaining means;
   said retaining means comprising a case adapted to receive said camera and having a plurality of apertures to enable operation of said camera; and
   said stand including means for configuring said camera to perform a document image capture function for capture of a digital image of a document.

14. A method of capturing a digital image using a digital camera capable of performing a document image capture function, said method comprising the steps of:
   fitting said camera to a stand;
   configuring said camera to operate in a document image capture mode;
   pointing said camera at a document which is to be the subject of a captured image;
   operating said camera to record in the camera a digital image of said document,
   said step of configuring said camera to operate in a document capture mode occurring automatically on fitting said camera to said stand by physical contact of a switch element on said camera with said stand,
   said step of configuring further comprising:
      configuring said camera's optic to zoom in or out to capture a predefined scan area;
      determining the clarity and resolution of the image formed by said camera; and
      focusing the image.

15. A method of capturing a digital image using a digital camera capable of performing a document image capture function, said method comprising the steps of:
   fitting said camera to a stand;
   configuring said camera to operate in a document image capture mode;
   pointing said camera at a document which is to be the subject of a captured image; and
   operating said camera to record in the camera a digital image of said document,
   said step of configuring said camera to operate in a document capture mode occurring automatically on fitting said camera to said stand by physical contact of a switch element on said camera with said stand,
   said step of configuring further comprising:
      adjusting the focal length of said camera to a predetermined length, said predetermined length being a distance between a scan area at the base of said stand and a position of an image plane of said camera when secured in said stand.

16. A system for capturing digital images of a document, said system comprising:
   a digital camera;
   a stand for supporting said camera; and
   a computer coupled with the digital camera for receiving the digital image of the document as recorded by the digital camera;
   said stand including at least one supporting member for the stand,
   a camera retainer on the stand for rigidly securing said digital camera, said stand being arranged for supporting said retainer so that the camera is in a position suitable for operation of said camera in recording a digital image of said document, said retainer being arranged so that placing said camera into said retainer automatically configures said camera to: (a) zoom in or out to capture a predefined scan area, (b) determine a clarity and resolution of image formed by said camera, and (c) focus the image to enable said camera to be used as a scanner capable of performing a document capture function.

17. A system as claimed in claim 16, wherein said retainer is arranged so that placing said camera into said retainer activates a mode of operation in said camera such that said camera automatically focuses onto a scan area at the base of said stand.

18. A system as claimed in claim 16, wherein said retainer is adapted to hold said camera in an orientation and spacing from the document such that said camera has a view of a scan area of size and shape suitable for placement of the document which is to be the subject of a captured image by said camera.

19. The system as claimed in claim 16, further comprising an electrical connection between said camera and said computer to enable downloading of digital images from said camera to said computer to provide the coupling of the camera with the computer.

20. The system as claimed in claim 16, wherein said stand further comprises at least one light source activated by placing said camera into said retainer.

21. The system as claimed in claim 16, wherein said computer includes a processor arrangement for processing images captured by said camera to optimize the quality of monochrome images obtained using a color image sensor.

22. The system as claimed in claim 16, wherein said camera includes a processor arrangement for processing images captured by said camera to optimize the image clarity.

23. The system as claimed in claim 16, wherein said camera includes a processor arrangement for processing images captured by said camera to optimize the quality of monochrome images obtained using a color image sensor.

24. A stand to hold a digital camera, said stand comprising:

at least one supporting member;

wherein said supporting member has at least one first end;

wherein said first end includes a base portion;

said supporting member having a second end including a camera retaining means;

the camera retaining means being arranged for holding, at different times, plural types of digital cameras having camera function switches at differing locations, the camera retaining means having controllers for the function switches of the plural types of cameras at different positions corresponding with the positions of the function switches of the plural types of cameras; and said stand including means for configuring said camera to perform a document image capture function for capture of a digital image of a document.

25. The method as claimed in claim 24, further comprising the steps of:

connecting a means for downloading at least one recorded digital image to said camera;

connecting said means for downloading to a computer;

configuring said camera to send said at least one digital image;

configuring said computer to receive said at least one digital image.

26. The method as claimed in claim 24, further comprising the step of:

operating and positioning at least one light source on said stand to illuminate the object being scanned.

27. The stand as claimed in claim 24, wherein said retaining means is adapted to hold said camera in an orientation and spacing from the base of said stand such that said camera has a view of a scan area of size and shape suitable for placement of an object which is to be the subject of a captured image by said camera.

28. The stand as claimed in claim 24, wherein said stand includes at least one light source for projecting light to illuminate an object being scanned.

29. The stand as claimed in claim 24, wherein said stand further comprises at least one light source activated by placing said camera into said stand.

30. The stand as claimed in claim 24, wherein said at least one supporting member is adjustable in height.

31. The stand as claimed in claim 24, wherein said at least one supporting member includes at least one hinge section.

32. The stand as claimed in claim 24, wherein said base portion comprises means for securing said stand to a surface.

33. The stand as claimed in claim 24, wherein said base portion is configured to house an object, which is to be the subject of a captured image by said camera, in a scan area.

34. A stand to hold a digital camera, said stand comprising:

at least one supporting member;

wherein said supporting member has at least one first end;

wherein said first end includes a base portion;

said supporting member having a second end including a camera retaining means;

the camera retaining means being arranged for holding, at different times, plural types of digital cameras having camera function switches at differing locations; and said stand including means for configuring said camera to perform a document image capture function for capture of a digital image of a document, said means for configuring including at least one projection in said retaining means for co-operating with a function switch of said camera.

35. A stand for holding a digital camera, said stand comprising:

at least one supporting member for the camera;

wherein said supporting member has at least one first end;

wherein said first end includes a base portion;

said supporting member having a second end including a camera retainer;

said retainer including an activator for configuring the camera on the retainer for performing a document image capture function for enabling the camera on the retainer to capture a digital image of a document, the camera retainer being arranged for holding, at different times, plural types of digital cameras having camera function switches at differing locations, the camera retainer having controllers for the function switches of the plural types of cameras at different positions corresponding with the positions of the function switches of the plural types of cameras.

36. The stand as claimed in claim 35, wherein said actuator for configuring includes at least one projection in said retainer for co-operating with a function switch of said camera.

37. The stand as claimed in claim 35, wherein said actuator for configuring further comprises electrical connections with said camera.

38. The stand as claimed in claim 35, wherein said actuator for configuring further comprises optical connections with said camera.

39. The stand as claimed in claim 35, wherein said retainer is arranged so that placing said camera in said retainer automatically configures said camera to zoom in or out to catch a predefined scan area, for determining clarity and resolution of an image formed by said camera and focusing the image.

40. The stand as claimed in claim 35, wherein said retainer is arranged so that placing said camera in said retainer automatically configures said camera according to image capture parameters optimized for document capture.

41. The stand as claimed in claim 35, wherein said retainer is arranged so that placing said camera into said retainer activates a mode of operation in said camera such that said camera automatically focuses onto a scan area at the base of said stand.

42. The stand as claimed in claim 35, wherein said retainer comprises a case adapted to receive said camera and having a plurality of apertures for enabling operation of said camera.

43. The stand as claimed in claim 35, wherein said retainer is adapted to hold said camera in an orientation and spacing from the base of said stand such that said camera has a view of a scan area of size and shape suitable for placement of the document which is to be the subject of a captured image by said camera.

44. The stand as claimed in claim 35, wherein said stand includes at least one light source for projecting light to illuminate an object being scanned.

45. The stand as claimed in claim 35, wherein said stand further comprises at least one light source, the retainer including an actuator for the at least one light source, the light source being arranged to be responsive to said camera being placed into said retainer.

46. The stand as claimed in claim 35, wherein said at least one supporting member is adjustable in height.

47. The stand as claimed in claim 35, wherein said at least one supporting member includes at least one hinge section.

48. The stand as claimed in claim 35, wherein said base portion comprises a structure for securing said stand to a surface.

49. The stand as claimed in claim 35, wherein said base portion is configured to house the document.

50. A stand for holding a digital camera, said stand comprising:
   at least one supporting member for the camera;
   wherein said supporting member has at least one first end;
   wherein said first end includes a base portion;
   said supporting member having a second end including a camera retainer;
   said retainer including an activator for configuring the camera on the retainer for performing a document image capture function for enabling the camera on the retainer to capture a digital image of a document, the camera retainer being arranged for holding, at different times, plural types of digital cameras having camera function switches at differing locations.

51. A method of capturing a digital image using a digital camera capable of performing a document image capture function, said method comprising the steps of:
   fitting said camera to a stand;
   configuring said camera to operate in a document image capture mode;
   pointing said camera at a document which is to be the subject of a captured image; and
   operating said camera to record a digital image of said document,
   the method being performed at different times with different types of digital cameras having function switches at different locations, the different digital cameras being fitted to the stand by placing the different digital cameras in one or more retainers having shapes for receiving the digital cameras, the one or more retainers having controllers for the function switches of the plural types of digital cameras at different positions corresponding with the positions of the function switches,
   placing the different types of digital cameras in the one or more retainers so that the function switches of the different cameras are at different positions corresponding with the positions of the function switches.

52. The method of claim 51 wherein the method is performed with plural retainers, such that different retainers have different sizes and shapes matching with different types of the digital cameras.

53. The method of claim 51 wherein the method is performed with a retainer having controllers for the plural digital types of cameras at different locations.

54. A method of capturing a digital image using a digital camera capable of performing a document image capture function, said method comprising the steps of:
   fitting said camera to a stand;
   configuring said camera to operate in a document image capture mode;
   pointing said camera at a document which is to be the subject of a captured image; and
   operating said camera to record in the camera a digital image of said document,
   the method being performed at different times with different types of digital cameras having function switches at different locations,
   the different digital cameras being fitted to the stand by placing the different digital cameras in one or more retainers having shapes for receiving the digital cameras, the one or more retainers having controllers for the function switches of the plural types of digital cameras at different positions corresponding with the positions of the function switches,
   placing the different types of digital cameras in the one or more retainers so that the function switches of the different cameras are at different positions corresponding with the positions of the function switches.

55. The method of claim 54 wherein the method is performed with plural retainers, such that different retainers have different sizes and shapes matching with different types of the digital cameras.

56. The method of claim 54 wherein the method is performed with a retainer having controllers for the plural digital types of cameras at different locations.

* * * * *